United States Patent [19]
Goodridge

[11] 3,756,338
[45] Sept. 4, 1973

[54] GYRO-CONTROLLED MOTORCYCLE
[76] Inventor: Harold M. Goodridge, 12832 Occidental Ave. South, Seattle, Wash. 98168
[22] Filed: Dec. 14, 1971
[21] Appl. No.: 207,763

[52] U.S. Cl.................. 180/30, 74/5.22, 280/266
[51] Int. Cl............................................. B62d 37/06
[58] Field of Search............... 180/1, 30 R, 30 B, 180/30, 33 R, 31; 74/5.22; 280/217, 266

[56] References Cited
UNITED STATES PATENTS

| | | | |
|---|---|---|---|
| 2,445,058 | 7/1948 | Fields | 180/33 B |
| 236,259 | 1/1881 | Reid | 280/260 |
| 1,362,024 | 12/1920 | McKee | 180/30 |
| 2,230,749 | 2/1941 | Hebert | 180/30 |
| 1,945,874 | 2/1934 | Weaver | 74/5.22 X |

*Primary Examiner*—Kenneth H. Betts
*Assistant Examiner*—John M. McCormack
*Attorney*—Clinton L. Mathis

[57] ABSTRACT

A motorcycle, to be steered and ridden, is disclosed. with a steering wheel and a driven wheel, preferably the steering wheel is a caster wheel. A spinning gyrowheel is provided for steering and stabilizing effects and is preferably coaxial with the driven wheel. Also, the driven wheel is hollow and encloses the spinning gyrowheel. A motor drives both the driven wheel and the spinning gyrowheel, but independently of each other. The power coupling between the motor and the spinning gyrowheel includes an overriding clutch and the power coupling to the driven wheel includes a torque converter.

10 Claims, 5 Drawing Figures

INVENTOR
HAROLD M. GOODRIDGE
BY
Clinton L. Mathis
ATTORNEY

INVENTOR
HAROLD M. GOODRIDGE
ATTORNEY

GYRO-CONTROLLED MOTORCYCLE

BACKGROUND OF THE INVENTION

In the art of two-wheeled vehicles, spinning gyrowheels have been employed to provide balancing or stabilizing effects. However, the said gyrowheels have not been provided in combination to provide a motorcycle which can be readily ridden in a conventional manner by a cyclist, i.e., where the cyclist is seated, feet extended to the usual foot pedals, and with hands on handlebar means. Also, no prior vehicles known to me have provided a common power source and two independent power coupling means from said common power source, one to the driven wheel of the motorcycle and the other to the spinning gyrowheel.

BRIEF DESCRIPTION OF THE INVENTION

The present invention is characterized by providing a motorcycle, which may be ridden by a rider straddling the cycle in a conventional manner, seated upon a seat, with the feet resting on foot pedals, and with hands on handlebar means. The motorcycle is provided with a steering wheel and a driven wheel. Preferably, the steering wheel is the forward wheel and is of the caster type. Also, preferably, the driven wheel is hollow and encloses a high-speed, driven, gyrowheel for steering and stabilizing effects of the motorcycle. An axle supports the driven wheel and also preferably supports the driven gyrowheel. Such axle being keyed to one thereof and rotatably mounting the other thereof.

A motor, as an internal combustion motor, is mounted on the cycle. The power output of the motor connects with a centrifugal clutch so the motor may be started, idled, and run up to predetermined speeds without delivering power to either the driven wheel or the gyrowheel. After a predetermined speed is reached, then power, from the motor, is delivered to two power couplings. One power coupling interconnects power from the centrifugal clutch with a driven wheel and preferably includes therein a torque converter. Such torque converter will function as an automatic transmission and power will be properly transmitted to the driven wheel by mere manipulation of the gasoline throttle of the motor.

There is a second power coupling which is independent of the first coupling and connects power from the centrifugal clutch with the driven gyrowheel. This coupling includes an overriding clutch, which eliminates any reduction of speed of the gyrowheel merely because of the reduction of the speed of the motor. Thus, the gyrowheel may be first accelerated to a speed to provide the desired gyroscopic forces, the later providing the desired steering and stabilizing effects. Then the motorcycle may be driven by the motor. The speed of rotation ratios between the motor and the driven wheel and the motor and the gyrowheel are such to maintain the desired speed of rotation of the gyrowheel for the effects described and which will be a plurality of times greater than the speed of rotation of the wheels of the motorcycle.

Preferably, the front wheel of the motorcycle is a caster wheel and the rear wheel is a driven wheel, the latter being hollow and enclosing the gyrowheel. Also, preferably, the caster wheel has a turning radius of up to 120°.

The gyrowheel has an axis which is horizontal and at right angles to the course of travel of the cycle as the same is ridden and is traveling. The gyrowheel and the driven and steering wheels, all rotate in the same direction. In accordance with established mechanical principles relating to gyroscopic forces, when a force is applied to cant or tip the axis of such a spinning gyrowheel, then the cycle carrying such a gyrowheel receives a force tending to turn the cycle to right or left depending upon factors including the direction in which the tipping force is applied. By having the gyrowheel and the driven wheel coaxial, I take maximum advantage of the said gyroscopic forces and they aid in the steering of the cycle. By sidewise shifting of the body weight of the rider to the right, a force is exerted to turn the cycle to the right and shifting to the left creates the opposite effect. The gyroscopic action involved is generally referred to as precession.

DESCRIPTION OF THE DRAWINGS

A more complete understanding of my invention may be had by reference to the accompanying drawings, illustrating preferred embodiments of my invention, in which like reference numerals refer to like parts, and in which.

DESCRIPTION OF THE PREFERRED EMBODIMENTS

Figure 2:
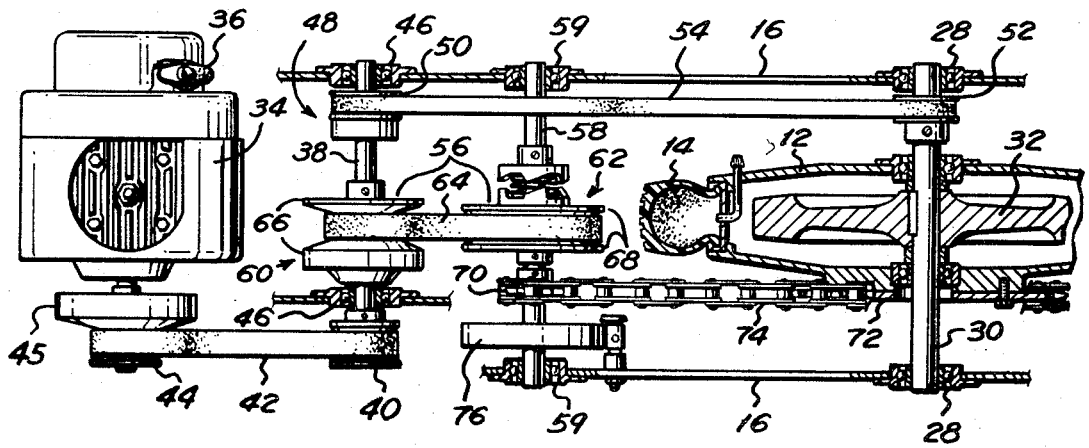
FIG. 2 is a top plan view of the structure of FIG. 1, on a larger scale than FIG. 1, showing the motor and driving mechanism, with parts shown in section, and with parts broken away.
Figure 1:
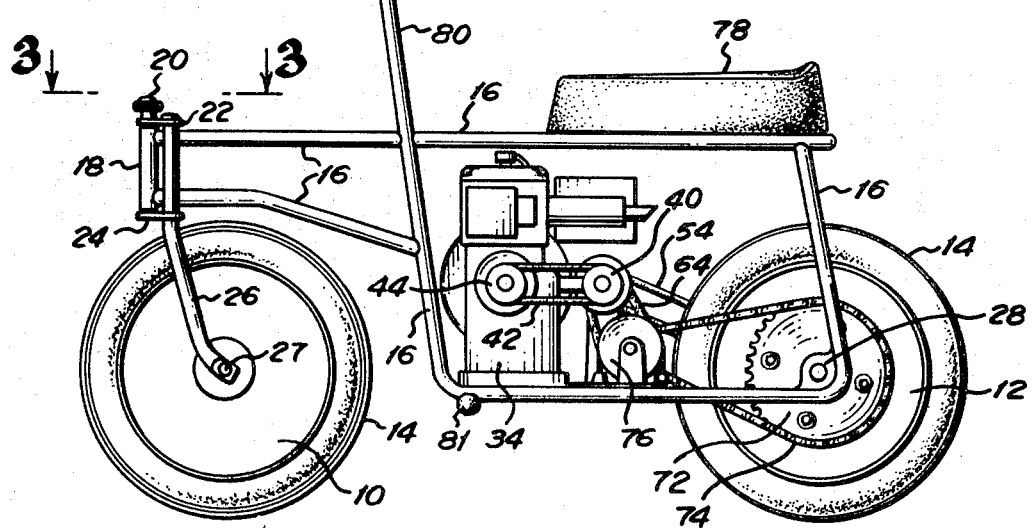
FIG. 1 is a side elevational view of a device embodying my invention.
Figure 3:
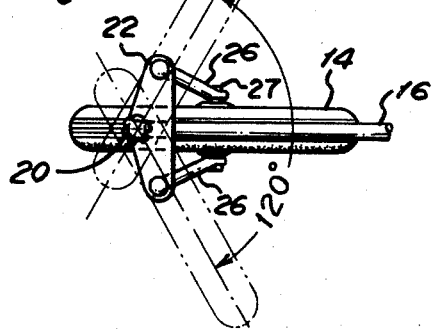
FIG. 3 is a fragmentary plan view taken substantially on broken line 3—3 of FIG. 2.

Referring first to FIGS. 1 to 3, this embodiment comprises longitudinally aligned steering and driven wheels 10 and 12. Each of the wheels 10 and 12 has mounted thereon a conventional tire, as a pneumatic tire 14. Conventionally, the driven wheel is not the steering wheel as the mechanics of providing a driven steering wheel is more complicated. Also, conventionally, the leading wheel of the cycle is the steering wheel. Thus, I have shown a conventional steering wheel and driven wheel in the various figures of my invention. However, it is to be understood that my invention may follow nonconventional cycles as to the wheel arrangements as to which wheel is driven and which wheel is the steering wheel and as to which wheel follows the other.

A cycle frame structure generally numbered 16, includes a forward bearing sleeve 18. A post 20 is mounted for turning movement in the sleeve 18 and top and bottom plates 22 and 24 are carried by said post 20. Plates 22 and 24 carry forked member 26, which in turn carries front axle 27, the latter rotatably mounting steering wheel 10. The length of the plates 22 and 24 and the relative position of the legs of the forked member 26 is such that the post 20 and the forked member 26 will have a suitable turning radius, such as 120°, as illustrated. The cycle frame 16 includes spaced apart bearings 28 for rotatively mounting driven shaft 30. The driven shaft 30 has keyed thereto gyrowheel 32 so that both rotate at the same speed. This driven shaft 30 functions as the rear axle and rotatively mounts driven wheel 12 so that said shaft 30 and said driven wheel 12 may be rotated independent of each other, in the same direction, in opposite directions, or either thereof may be at rest while the other is rotating.

A suitable source of power is indicated by a four-cycle, internal combustion motor 34, having a starter cord 36. Such type of motor and starter cord are standard on the market and can be readily obtained. The power of motor 34 is preferably coupled to centrifugal clutch 45. Clutch 45 does not engage sheave 44 until clutch 45 is rotating over a predetermined set speed, such as 1,200 rpm. Thus, motor 34 may be started, warmed up, and allowed to idle without transmission of power to sheave 44. After such predetermined speed is reached, then power is transmitted to sheave 40 on jackshaft 38 by any suitable means, such as belt means 42. The jackshaft 38 is supported by the motor-cycle frame structure 16 by spaced apart bearings 46 connected therewith. Preferably, the jackshaft 38 mounts an overriding clutch means 48. Such clutch means 48 has a power output sheave part 50 and the resultant mode of operation is that the sheave part 50 is coupled to rotate with and increases its speed of rotation with the speed of rotation of the jackshaft 38. However, slowing down or stopping of the rotation of the jackshaft 38 will not affect the rotation or the speed of rotation of the output sheave part 50. Sheave 52 is carried by shaft 30, and sheave 52 and output sheave part 50 are suitably coupled by belt means 54.

By the power train just described, rotary motion of the motor 34 provides rotary motion of jackshaft 38 through centrifugal clutch 45, sheaves 44 and 40, and belt means 42. The rotary motion of jackshaft 38 is transmitted to driven shaft 30 and gyrowheel 32 by output sheave part 50, sheave 52, and belt means 54. The gyrowheel 32 will always be driven at its top speed with top speed of the motor 34 but upon decreasing of the speed of the motor 34, this will not be reflected to reduce the speed of the gyrowheel 32 because of the overriding clutch means 48. Thus, when the speed of rotation of the motor 34 is above the engaging speed of centrifugal clutch 45, the speed of rotation of the gyrowheel 32 will correspond and will be increased as the speed of motor 34 increases but will not be decreased as the speed of motor 34 decreases.

Sheave 52 is carried by shaft 30 and sheave 52 and the output sheave part 50 of overriding clutch means 48 are suitably coupled by belt means 54.

Rotary movement of the jackshaft 38 is preferably transmitted by a torque converter 56 to a second jackshaft 58. Torque converters may be obtained as standard merchandise on the market and a suitable source is Comet Industries of Richmond, Ind. In general, such coverter 56 comprises a driver member 60 and a driven member 62 coupled together by belt means 64. The torque converter 56 "cuts in" or does not transmit power from the driver member 60 to the driven member 62 until the jackshaft 38 is rotated above a predetermined minimum, selected to be above the minimum of centrifugal clutch 45, thus a speed of 2,200 rpm is suitable. The mode of operation of such torque converter 56 includes: when motor 34 is rotating at a speed over the minimum speed of centrifugal clutch 45 (1,200 rpm) and over the minimum speed of torque converter 56 (2,200 rpm), jackshaft 58 is caused to turn at a speed of much less than that of jackshaft 38.

As the speed of jackshaft 58 increases, then the relative ratio of rotation of jackshaft 58 increases to that of jackshaft 38. Thus, when the cycle starts to travel, the jackshaft 38 may be rotated rapidly and the jackshaft 58 will be rotated at a lesser speed providing the mechanical advantage to get the cycle in motion. Thereafter, the jackshaft 38 will be rotated relatively slower and the jackshaft 58 rotated relatively faster until the jackshaft 58 rotates at a given ratio to jackshaft 38, such as 1 to 1. In part, this is accomplished by clutch plate part 66 of driver member 60 which provides a gradually increasing sheave diameter on jackshaft 38 and the clutch part 68 of the driven member 62 which provides a gradually decreasing sheave diameter on jackshaft 58.

Jackshaft 58 carries sprocket 70 and driven wheel 12 carries sprocket 72. Sprocket chain 74 is reeved about said sprockets 70 and 72. Thus, whenever jackshaft 58 turns, driven wheel 12 will likewise turn and they will both be stopped at the same time. Jackshaft 58 mounts the brake drum of brake means 76, which has a suitable operating lever means (not shown) for operation by the rider of the cycle.

During travel of the cycle of FIGS. 1 to 3, the gyrowheel 32 will be rotated at the desired speed to provide the stabilizing force to maintain the cycle in an upright position. The motor 34 may be rotated at speeds between 1,200 rpm (cut-in speed of centrifugal clutch 45) and 2,200 rpm (cut-in speed of torque converter 56) and power will be transmitted to driven shaft 30 and gyrowheel 32 thereon. Suitable ratios are provided so that at such speeds the gryowheel 32 is driven at a speed to provide for effective steering and stabilization forces. After such initial speed of the gyrowheel 32 is obtained, then the rider (not shown), supported by seat means 78 will cause motor 34 to rotate at a sufficiently high speed to transmit power through the torque converter 56 and cause the jackshaft 58 to turn and with it, sprocket 70, sprocket chain 74, sprocket 72, and driven wheel 12. At first, the motor 34, jackshaft 38, and jackshaft 58 will be caused to rotate at desired relative speeds to provide the initial mechanical advantage to cause the vehicle to travel, and thereafter merely by controlling the throttle to the gasoline engine 34 through the torque converter 56, the cycle may be caused to travel at a desired speed. The relative gear ratio of motor 34 and driven shaft 30 to that of motor 34 and driven gyrowheel 32 (through the power trains previously described) should be such so that the gyrowheel 32 will be rotating at the desired speed during normal speeds of the cycle to provide the necessary and desirable stabilizing forces and gyroscopic reaction for steering purposes.

In the form of my invention shown in FIGS. 1 to 3, there is no lever or handlebar connection with the forked member 26. The mounting of the wheel 10 makes the same a caster wheel and the form, dimension and arrangements of the parts thereof are such that the said wheel 10 properly tracks when the cycle is propelled or tends to follow a straight line. As there are no handlebars connected with the fork 26, handlebars 80 are connected with the cycle frame structure 16 and the rider can better balance his or her body weight by sitting upon the seat means 78, resting his or her upper body weight against the handlebars 80 by grasping and resting against the same, and resting his feet on the usual foot pedals 81.

When the cycle is traveling, the same may be steered by shifting of the body weight one side or the other, i.e., shifting the body weight to the right will cause the vehicle to turn to the right and shifting the body weight to the left will cause the cycle to turn to the left and the extent of shifting will determine the extent of turning. Due to the action of the gyrowheel 32 and the resultant force upon tipping or canting of the axis 30 of the gyrowheel 32, the cycle can be readily steered merely by the rider leaning his or her body weight to one side or the other. This action is aided by the positioning of the axis of the gyrowheel 32 coaxial with that of the driven wheel 12.

Figure 4:
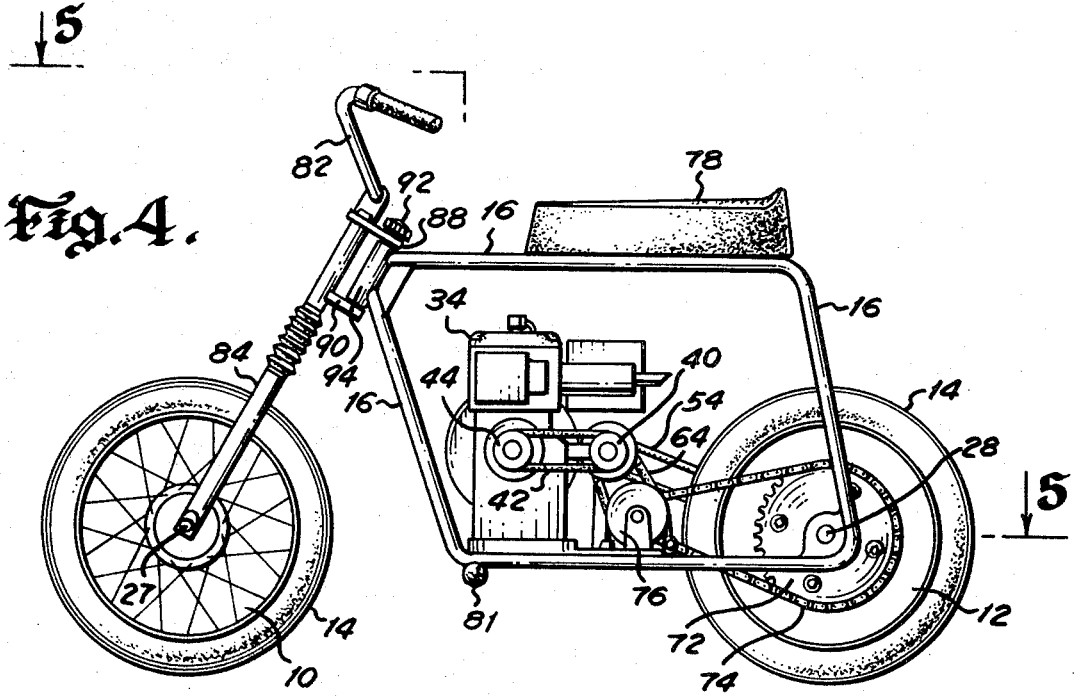
FIG. 4 is a side elevational view of a modified form of my invention.
Figure 5:
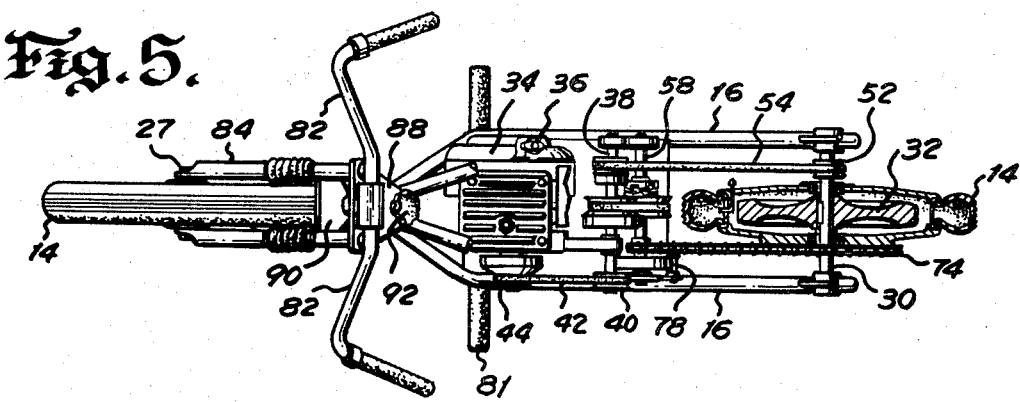
FIG. 5 is a top plan view of the structure of FIG. 4 and with parts shown in section, and taken substantially on broken line 5—5 of FIG. 4.

In the form of my invention shown in FIGS. 4 and 5, the cycle varies from that shown in the previous figures in that the device of FIGS. 4 and 5 is provided with conventional handlebars 82 secured to a fork member 84. The fork member 84 is pivotally secured to the cycle frame structure 16 by any suitable means, as top and bottom plates 88 and 90, which carry a post 92 mounted in forward sleeve bearing 94, the latter being a part of the cycle frame structure 16 and also being the counterpart of the sleeve 18 of the previous figures. The remaining parts of their structure, FIGS. 4 and 5, may be the same as the corresponding parts of FIGS. 1 to 3 and in the interest of brevity, such parts are incorporated by reference, without further description, and when convenient, like parts are given like reference numerals for ready identification.

SUMMARY

The motorcycle of my invention to be steered and ridden by a rider comprises: longitudinally alined steering and driven wheels 10 and 12. Cycle frame 16 supports axles 27 and 30 which rotatively mount said wheels. A first axle means 27, carried by fork means 26, supports said steering wheel 10 and a second axle means 30 is carried by said frame means 16 and supports driven wheel 12. Driven wheel 12 comprises a hollow housing which mounts therein a spinning gyrowheel 32. A source of power is illustrated by motor 34 carried by the frame means 16, centrifugal clutch 45, sheave 44, belt means 42, sheave 40, and jackshaft 38. A first power coupling means (torque converter 56, jackshaft 58, sprocket 70, sprocket chain 74, and sprocket 72 connected with wheel 12) interconnects the source of power with the said driven wheel 12. A second power coupling means (from jackshaft 38, then overriding clutch means 48, belt means 54, and driven shaft 30 keyed to gyrowheel 32) interconnects the source of power with the spinning gyrowheel 32 mounted for rotation on the driven axle means 30 and mounted for rotation independent of the driven wheel 12. By the use of the overriding clutch 48 in the combination, the gyrowheel 32 may be caused to turn at a relatively high speed to provide the desired stabilizing and steering forces of the cycle but such speed of rotation will not be reduced merely because of a reduction in the speed of rotation of the power output shaft 38 from the motor 34.

In the form of my invention shown in FIGS. 1 to 3, the steering wheel is a caster wheel, while in the form of the invention shown in FIGS. 4 and 5, the steering wheel is steered through conventional handlebars 82. Also in the form shown in FIGS. 1 to 3, the steering radius of the caster wheel is approximately 120°.

In both forms of my invention, the steering wheel is illustrated as the leading wheel and the trailing wheel is illustrated as the driven wheel. Also, in each instance, the spinning gyrowheel is illustrated as mounted on the axle of the driven wheel. This permits maximum utilization of the gyroscopic forces in steering the cycle by shifting of the body weight of the cycle rider.

A torque converter 56 is disposed in the power coupling to the driven wheel 12 and provides for automatic "gear shifting" in transmitting power to said driven wheel 12.

The wheel 12 comprises a hollow housing which mounts therein the spinning gyrowheel 32. This provides for safety even though the gyrowheel 32 may be rotated at relatively high speed and at a speed which is a plurality of times greater than the speed of rotation of the driven wheel, all of which speed of the gyrowheel 32 may be desired in the interest of providing the desired degree of stability and mode of steering of the cycle described.

Obviously, changes may be made in the forms, dimensions, and arrangements of the parts of my invention without departing from the principle thereof, the above setting forth only preferred forms of embodiment of my invention.

I claim:

1. A motorcycle to be steered and ridden by a rider comprising longitudinally alined steering and driven wheels; frame means; a first axle means carried by said frame means and supporting said steering wheel for rotation and steering thereof; a second axle means carried by said frame means and supporting said driven wheels for rotation thereof; a source of rotary power supported by said frame means; a first power coupling means interconnecting said source of power with said driven wheel; a spinning gyrowheel mounted for rotation on said second axle means independently of said driven wheel; and a second power coupling means interconnecting said source of power and said spinning gyrowheel, said second power coupling means including therein an overriding clutch means eliminating reduction of the speed of the spinning gyrowheel upon a reduction of speed of the source of power.

2. The combination of claim 1, wherein the steering wheel is a caster wheel.

3. The combination of claim 2, wherein the steering radius of said steering caster wheel is approximately 120°.

4. The combination of claim 2, wherein the steering wheel is the leading wheel of the motorcycle.

5. The combination of claim 1, wherein the second axle means is fixed to said spinning gyro and the driven wheel is rotatively mounted on said second axle means.

6. The combination of claim 1, wherein a torque converter is disposed in said first power coupling means.

7. The combination of claim 1, wherein the driven wheel comprises a hollow housing relatively rotatable to said second axle means and said spinning gyro is rotatively mounted within said housing and fixedly mounted on said second axle means.

8. The combination of claim 1, wherein said second power coupling means provides a speed of rotation of said spinning gyro which is a plurality of times greater than that of said driven wheel.

9. The combination of claim 1, wherein said second power coupling means includes therein an overriding clutch.

10. The combination of claim 1, wherein the output of said source of power has coupled therewith and delivers its output thru centrifugal clutch means.

* * * * *